Figure 9:
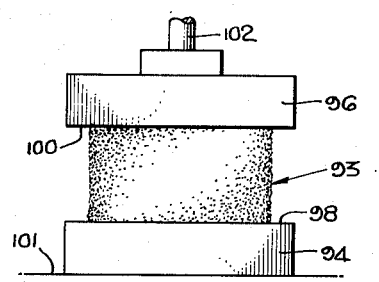

Aug. 4, 1953  R. E. SCHWARTZ  2,647,851
METHOD OF MAKING A FIBER GLASS MAT
Filed Feb. 1, 1952  3 Sheets-Sheet 1
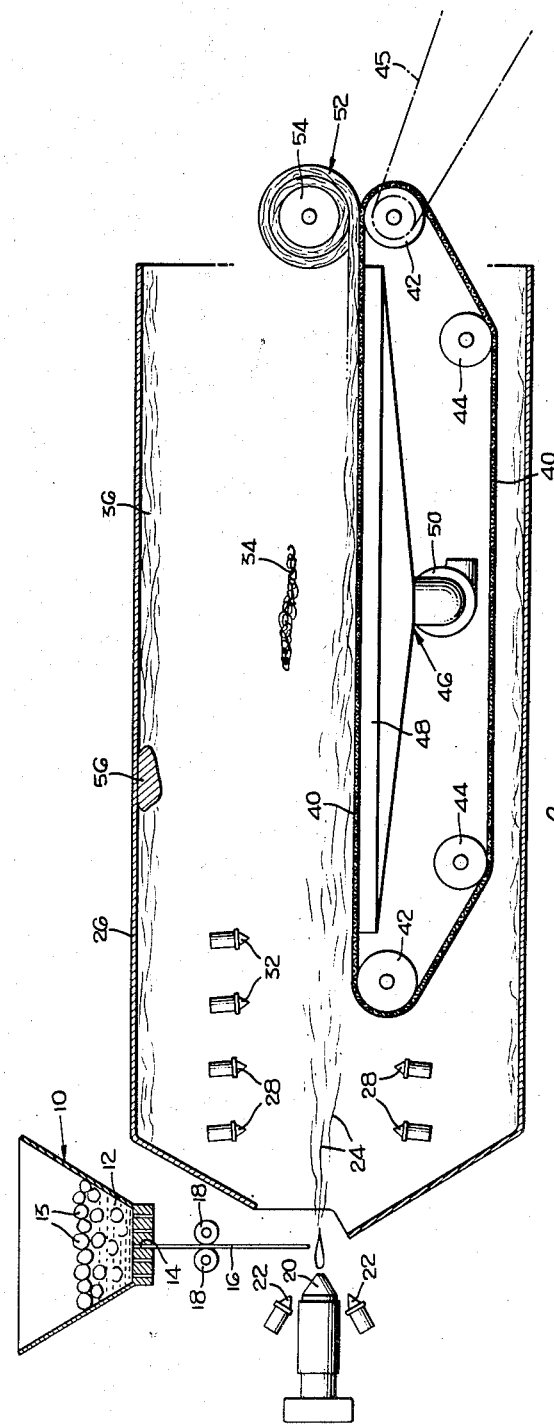
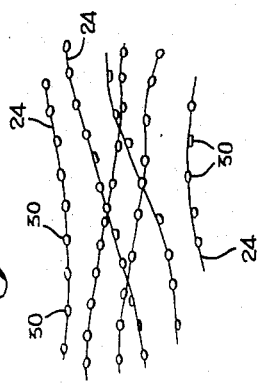
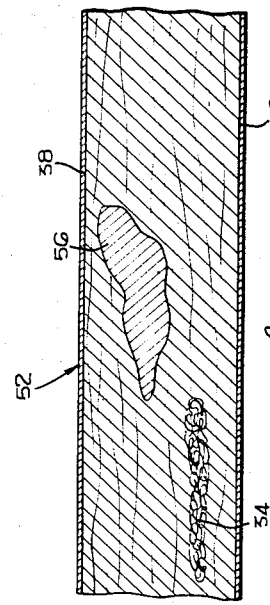
RALPH E. SCHWARTZ,
INVENTOR.
BY
ATTORNEY Aug. 4, 1953   R. E. SCHWARTZ   2,647,851
METHOD OF MAKING A FIBER GLASS MAT
Filed Feb. 1, 1952   3 Sheets-Sheet 2

RALPH E. SCHWARTZ,
INVENTOR.
BY
ATTORNEY

Aug. 4, 1953 R. E. SCHWARTZ 2,647,851
METHOD OF MAKING A FIBER GLASS MAT
Filed Feb. 1, 1952 3 Sheets-Sheet 3

RALPH E. SCHWARTZ,
INVENTOR.
BY
ATTORNEY

Patented Aug. 4, 1953

2,647,851

UNITED STATES PATENT OFFICE 2,647,851

METHOD OF MAKING A FIBER GLASS MAT

Ralph E. Schwartz, Hollywood, Calif., assignor to Vibradamp Corporation, Los Angeles, Calif., a corporation of California Application February 1, 1952, Serial No. 269,429

1 Claim. (Cl. 154—101)

My present invention relates to mats composed of glass fibers which are bound together by a binder material, and more particularly to my novel method of making these mats of glass fibers and to the finished mats which are produced by my novel method.

The usual prior art method of making mats of glass fibers was to force quantities of molten glass through a plurality of heated dies to produce primary glass fibers, which were then broken up into a large number of smaller secondary glass fibers by passing them in front of hot gas jets. These secondary fibers were then collected on a moving belt and they were sprayed with a binder solution as or after they were so collected on the belt. The fiber laden belt was then passed through a heating area in which hot air was forced through the layer of fibers to completely cure or polymerize the binder.

These prior art mats were limited in thickness because there was a normal tendency for the fibers to become unevenly distributed through the mat if the mat was made too thick.

One prior attempt to solve this problem of non-uniformity or uneven distribution of the fibers throughout the mat was to make an elongated, relatively thin mat of glass fibers in the above manner and to weave it upon itself in a criss-cross manner by a textile "lapper." The binder was sometimes applied to the layers as the web was formed by the "lapper" and ordinary yarn was often applied to the web during the forming process. However, despite these precautions, unevenness of distribution of the fibers was still inherent in this method, and as a result the load-deflection and fatigue characteristics were not suitable for many important uses of such bonded glass fiber mats. Further, it was difficult, if not impossible, to obtain a finished mat having any particular predetermined density over a wide range of densities when the mat was constructed in accordance with the prior art methods.

During all of the prior art processes of making fiber glass mats bound together by a binder material the mats were heated until the binder material became substantially completely cured or polymerized. This caused the binder material in those prior art mats to become hard and brittle and there was a tendency for the binder material to concentrate at juncture points between adjacent, contacting glass fibers. Both of these characteristics greatly limited the load-deflection and fatigue characteristics of the finished prior art mats.

Compaction of these prior art mats caused many of the individual glass fibers in the mats to be broken by being brought into abrasive inter-contact. Such compaction of these prior art mats also caused brittle binder concentrations at juncture points between adjacent, and contacting glass fibers to crack or break. A further result of compaction of prior art mats was that it often broke oversized glass fibers in the mats.

These fiber and binder breakages during the use of the prior art mats resulted in glass fiber mat fatigue during operative use of the mats.

In view of these and other problems in the prior art, it is an object of my present invention to produce a fiber glass mat which has unusually good load-deflection and fatigue characteristics, and which may be subjected to relatively high stresses without crumbling.

Another object of my present invention is to provide a method of making a fiber glass mat having improved load-deflection and fatigue properties of the character described.

Other objects and advantages of my invention will be apparent from the following description and claims, the novelty consisting in the features of construction, combination of parts, the unique relations of the members, the relative proportioning, disposition and operation thereof, and the novel method steps, all as if more completely outlined herein and as is particularly pointed out in the appended claim.

Figure 10:
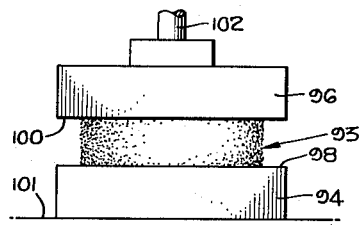
Figure 4:
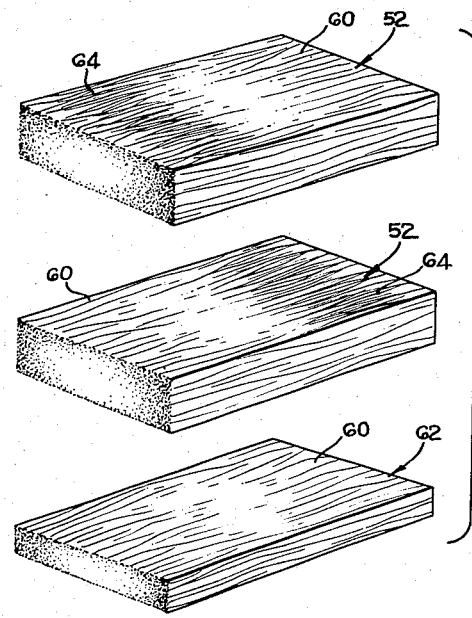
Figure 5:
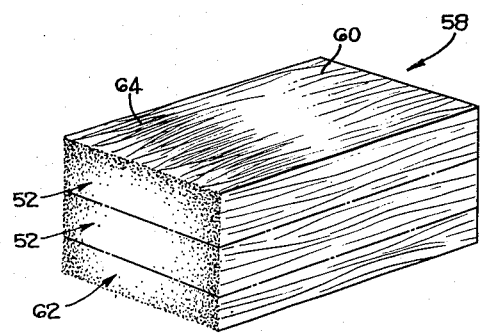
Figure 7:
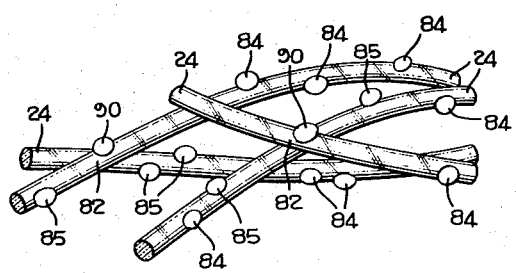
Figure 6:
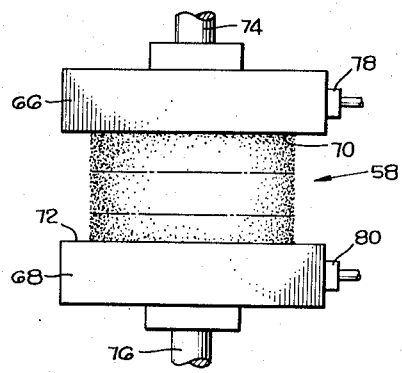
Figure 8:
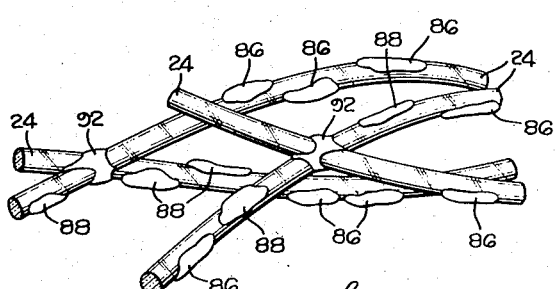

In the accompanying drawings, which form a part of this present application,

Figure 1 is a side elevation, partly in section, of my preferred apparatus for making my substantially uncured or unpolymerized individual mat, Figure 2 is an enlarged sectional view of a segment of my substantially uncured or unpolymerized individual mat, Figure 3 is a greatly enlarged view of some of my secondary glass fibers with binder droplets sprayed thereon, Figure 4 is a perspective view showing three of my substantially uncured or unpolymerized individual mats of glass fibers which are in spaced inter-relationship before they are stacked together, Figure 5 is a perspective view showing the individual mats of Figure 4 stacked together to form one of my laminated mats, Figure 6 is a side elevation of my substantially uncured or unpolymerized laminated mat operatively engaged in my heating and pressurizing apparatus, Figure 7 is a greatly enlarged fractional view of several of my glass fibers on which a binder material has been sprayed, Figure 8 is a view similar to Figure 7 with the binder material partially polymerized in accordance with the present invention, Figure 9 is a side elevation of my laminated mat operatively engaged in my cycling apparatus, Figure 10 is a view similar to Figure 9 with my laminated mat compacted to substantially one-half of its original thickness as shown in Figure 9.

Figure 11:
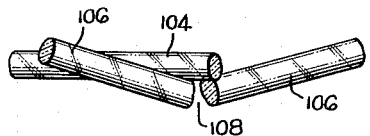

Figure 11 is an enlarged fragmentary perspective view of two of my glass fibers without any binder material between them which have been brought into such abrasive contact with each other that one of them has been broken.

Figure 12:
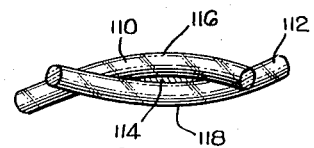
Figure 13:
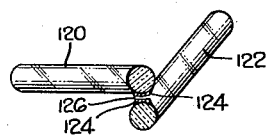
Figure 14:
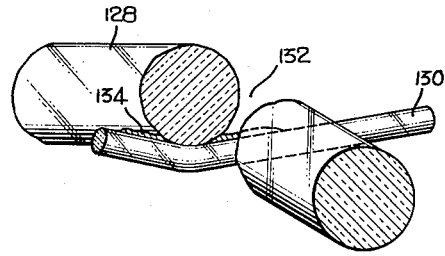
Figure 15:
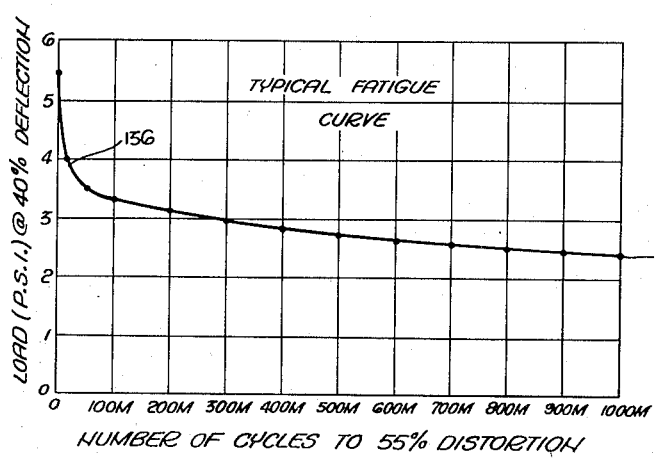

Figure 12 is an enlarged fragmentary perspective view of two of my glass fibers with a binder smear cushion on one of them, positioned partially between them, which have been brought toward each other sufficiently to cause said fibers to bend, Figure 13 is an enlarged fragmentary perspective view of two of my glass fibers which were bound together by a binder material bond that has been broken by relative motion between the two fibers, Figure 14 is an enlarged fragmentary perspective view showing two of my glass fibers of unequal diameters which have been brought toward each other sufficiently to cause one of them to break, and Figure 15 is a graph showing the load-deflection and fatigue characteristics of my finished mat.

Referring to the drawings, and particularly to Figure 1 thereof, I provide a vessel 10 which I heat by any conventional means (not shown) to maintain molten glass 12 therein in the molten state. Pieces of solid glass 13 may be supplied to vessel 10 from time to time to keep the supply of molten glass 12 within vessel 10 at the desired level.

Molten glass 12 is forced by gravity through one or more heated dies 14 in the bottom of vessel 10 which are heated by conventional means (not shown), and it is shaped by my dies 14 into one or more primary glass fibers 16, the number of primary glass fibers in each batch being determined by the number of my dies 14.

Although any number of my dies 14 composed of any suitable material may be used, I preferably provide a large number of these dies 14, which are preferably made of platinum and electrically heated by conventional means (not shown).

I then pull primary fibers 16 downwardly by one or more pairs of opposing feed rollers 18 which feed the primary fibers 16 into position in front of one or more hot gas jets 20 which blow ignited gas substantially horizontally against the primary fibers 16.

Disposed on opposite sides of each of my gas jets 20 is a pair of air jets 22 which blow air under high pressure convergently into the gas stream from said jet 20 to greatly increase the flow of the ignited gas from said jet 20.

This combination of air and burning gas from these jets produces a high-speed movement of hot gaseous matter which strikes the primary glass fibers 16 and splits or shatters each of the primary glass fibers 16 into a multiplicity of secondary glass fibers 24, each of which has a much smaller diameter than the diameter of a primary fiber 16.

I accurately control, respectively, the temperature of molten glass 12, the temperature of heated dies 14, the speed of rotation of feed rollers 18, the volume and rate of flow of the gas from the gas jets 20, the volume and rate of flow of air from the jets 22 and the kind, size and quality of glass 13 that I use in order that each of these factors will bear its proper relation to the others and will remain substantially constant during the formation of each mat made by my present method. Also each of these factors may be varied for different kinds of mats by adjusting the respective controls of any or all of these factors.

By maintaining such accurate controls virtually all of my primary glass fibers 16 and of my secondary glass fibers 24 are substantially uniform in their respective sizes. This enhances the fatigue factor of my finished mat, and also helps to eliminate from my finished mat all "streamers," or primary fibers 16 which otherwise tend to pile up in front of jets 20 and 22. Further, these controls help to completely eliminate from all sources single primary fibers 16 from my finished mat.

After my secondary glass fibers 24 are formed in the above manner they are blown by the gaseous stream from jets 20 and 22 substantially horizontally into a forming hood 26, preferably made of sheet metal or any other suitable material.

A liquid binder solution is sprayed through one or more binder jets 28 into the forming hood 26 while the secondary glass fibers 24 are in the forming hood. Binder jets 28 are disposed within or adjacent to the forming hood in position to direct their spray into the forming hood 26 onto fibers 24. This sprayed liquid binder solution is deposited in substantially evenly distributed droplets 30 on the individual secondary glass fibers 24, as is seen in Figure 3 hereof.

I carefully control the binder solution content and viscosity, the size of the binder droplets in the spray, the quantity ratio of total binder solution to total glass fibers and the disposition and direction of the binder jets 28. By these controls I insure that each of the secondary fibers 24 receives substantially the same amount of binder per unit of length and I insure that my finished mat has a substantially uniform binder distribution and the correct quantity ratio of binder to glass.

My binder which is thus sprayed in solution may be any one of a wide variety of binder substances, including all thermo-setting plastics. This group includes, but is not limited to, all of the polyesters, all of the phenols, all of the urea formaldehydes, all of the vinyls, all silicones and various combinations of all of these. The preferred binder will be determined by the use to which the finished mat is to be put, and by the kind of glass which I use.

I provide one or more adjustable water jets 32 within or adjacent to my forming hood 26 which are positioned and adapted to spray water into the interior of my forming hood 26.

This water spray reduces the amount of electrostatic charging of my secondary glass fibers 24 so that the inter-electrostatic attraction among secondary fibers 24 and between secondary fibers 24 and the forming hood 26 will be reduced or minimized. This, in turn, reduces or minimizes the amount of "balling" or entwining of secondary fibers into "balls" 34, such as the ones illustrated in Figures 1 and 2, and also reduces or minimizes the amount of piling up of secondary fibers on the forming hood 26 in the manner illustrated at 36 in Figure 1.

It is important to reduce the amount of "balls" 34 of secondary fibers 24 and of piles of secondary fibers 36 which find their way into the finished mat, as each of these impurities reduces the load-deflection and fatigue characteristics of the finished mat.

I adjust the amount of water sprayed from water jets 32 in view of the particular type of glass and the particular kind of binder which I use in each case, in order to reduce the above electrostatic charges as much as possible.

I also adjust the volume and direction of flow of my water jets 32 in order to carefully control the temperature within forming hood 26. If the temperature within forming hood 26 is maintained at the correct value, considering the speed of the forming belt 40 on which the mat is formed and the amount of binder sprayed into the forming hood, a "skin" 38 of partially polymerized binder material having the desired toughness forms on the flat, longitudinal surfaces of the finished mat, as illustrated in Figure 2.

This "skin" 38 of partially polymerized binder material makes my mats, prior to my hereinafter described heat treatment, sufficiently sturdy to retain their uniformity and constitutes a sufficiently solid surface to prevent the un-heat-treated mats from sticking to anything with which they come into contact. Thus, for example, one of my mats may be rolled up, as, for storage or transportation, and then it may be later satisfactorily unrolled without the opposed surfaces of the mat in the roll becoming stuck together.

By thus controlling the temperature within the forming hood 26 so that the "skin" 38 is partially polymerized to the correct degree, instead of being completely polymerized, one of my un-heat-treated mats will readily adhere to another of my un-heat-treated mats of the same character when they are stacked and pressure is applied to them in the manner hereinafter described.

Positioned in the lower portion of my forming hood 26 is a forming belt 40 which is disposed around a pair of forming belt rollers 42, and also around one or more idler rollers 44, if desired. One of the rollers 42 is operatively connected, as by belt 45, to an adjustable-speed source of rotary power (not shown), which may be manually adjusted by conventional means (also not shown), to cause the belt 40 to move at any desired speed.

I provide an air suction mechanism 46 between the top and bottom portions of forming belt 40 which comprises an air suction chamber 48 that has an open portion disposed flatly against the bottom of the upper portion of forming belt 40 and a suction pump 50 which is operatively connected to the suction chamber 48.

Air suction mechanism 46 functions in the same manner as an ordinary vacuum cleaner and draws air down through the porous forming belt 40. This, in turn, draws the secondary fibers 24 with binder droplets thereon down from the interior of forming hood 26 onto the forming belt 40.

Uniformity of the fiber distribution on the forming belt 40 may be aided by adjusting the amount of suction provided by suction pump 50, and also by controlling the amount and direction of the gas and air that is blown from jets 20 and 22, respectively. Thus, I am able to produce mats which are substantially uniform throughout in thickness and in density, and for this reason I can produce fiber glass mats that are considerably thicker than the ordinary prior art mat of glass fibers.

My un-heat-treated mats are generally formed with a thickness of from ¼" to 1", but they can be made to any desired thickness by adjusting the rate at which primary fibers 16 are moved in front of jets 20 and 22, by controlling the number of secondary fibers 24 which are produced from one primary fiber 16 and by controlling the speed of forming belt 40.

The density of my un-heat-treated mat is also controllable by controlling the diameter and length of secondary fibers 24 and the amount of suction provided in suction chamber 48.

My completed, un-heat-treated mat 52 is wound on a spool 54 positioned near the rear end of forming hood 26. Spool 54 is rotated by any conventional, controllable source of rotary power (not shown).

In addition to the controls which I have hereinabove described, I also provide a series of visual inspection controls, which I will now describe.

One such visual inspection control is provided to watch and inspect the glass fibers entering the forming hood 26 and to physically remove any primary fibers 16 or primary fiber streamers 34 that may enter the forming hood 26, either before or after they are deposited on forming belt 40.

Another such visual inspection control is provided to watch and inspect the un-heat-treated mat 52 as it comes off of the forming belt 40, or to inspect the mat 52 at any later time, and then to remove and reject from the finished mat the entire section of the mat having such a primary fiber 34 in it.

Another visual inspection control is provided to watch and inspect the mat 52 as it is being formed, or after it has come off of the forming belt 40 and to remove and reject from the finished mat any portions of the mat which are not uniform in thickness or in fiber distribution.

An additional visual inspection control is provided to watch and inspect the hood 26 for blobs 56 of binder material, such as that shown in Figure 1, which may form on the inner surface of forming hood 26, and for piled-up secondary fibers 36 which may also form on the inner surface of forming hood 26, and to physically remove these undesired binder and secondary fiber concentrations before they fall onto the forming belt. (See Figure 2.)

Also, I inspect mat 52 for any "balls" 34 of secondary fibers, for any blobs 56 of binder and for any piled-up secondary fibers 36 which may be deposited in the mat 52 in spite of the previous controls, and I remove and reject any portions of mat 52 which may contain any such impurities.

In the preferred embodiment of my invention I stack a plurality of my individual, un-heat-treated mats 52 one upon the other to form a laminated mat 58 such as that shown in Figure 5 of the drawings hereof.

All of the glass fibers in each of my individual, un-heat-treated mats 52 which are produced in the above manner are oriented in substantially the same direction, so that each of my mats 52 has a fiber "grain" in one direction, as shown at 60 in Figures 4 and 5. By forming my laminated mat 58 from a plurality of my mats 52 which all have this fiber "grain" running in the same direction, any unevenness in the density or thickness of any of my individual mats 52 will be at least partially averaged out in my completed laminated mat 58.

A further method by which I average out deviations of the density or thickness in individual mats 52 is illustrated in Figure 4. Figure 4 shows two whole individual mats 52 and a flat segment 62 of another mat 52, that has been sliced off of that other whole individual mat 52 (not shown) in spaced inter-relationship before being stacked together to form the laminated mat 58.

It will be noted that the two whole individual mats 52 in Figure 4 have portions 64 which are more dense than the remaining portions of these two mats 52. The mats 52 having these uneven portions 64 are inter-oriented in the manner shown in Figure 4, when they are assembled into laminated mat 58, so that the uneven portions 64 thereof will lie at opposite ends of the finished laminated mat 58. When the mats are so stacked the uneven portions 64 are thus averaged out, giving the finished laminated mat 58 a substantially even density throughout.

Any unevenness in the thickness of the mats 52 can also be compensated for in the same manner described above for compensating for unevenness in density of mats 52.

The mat segment 62 shown in Figure 4 contains no density or thickness irregularities, so that it merely adds to the total thickness of the laminated mat 58 without any need for density or thickness compensation.

The number of my individual un-heat-treated mats 52 which I stack together in practising my present invention can be determined by the final product which is produced when I heat-treat the stacked mats in the manner hereinafter described, because the final desired thickness of my heat-treated and compressed laminated mat, the final density, and the percentage of weight loss due to the removal of moisture during my heat-treating operation are all known factors.

For example, if the final product is to have a thickness of one inch, an area of one square foot, a density of 6 pounds per 144 cubic inches, and if there is a moisture loss of 8% by weight of the stacked mats during the heat-treating part of my process, I stack enough individual mats 52 each having one square foot area together to make the weight of the combined individual mats 52 total 6.52 pounds, in order that the 8% moisture loss will leave a 6 pound laminated, heat-treated mat.

Figures 4 and 5 of the drawings hereof illustrate one method by which I achieve any desired density in the manner hereinbefore described when the weight of an integral number of my individual mats 52 would not be the correct amount. In the example shown in Figures 4 and 5, two and one-half mats 52 stacked together would form a stacked mat 58 of the desired weight per unit of area. Thus, two whole mats 52 and one segment 62 of a mat that has been sliced off of another whole mat 52 and which is substantially one-half as thick as a whole mat 52, are stacked together to form the stacked mat 58.

Another way to achieve any desired density of the stacked mat 58 is to make the single mats 52 of such a thickness that an integral number of such mats 52 will produce the desired density. Thus, for example, the three mats illustrated in Figure 4 can be so made that each of them has one-third of the total thickness of the stacked mat 58, shown in Figure 5.

An additional method of achieving any desired density of my stacked mat 58 is to adjust the size of the individual fibers of glass which are used to form my mats 52 so that an even multiple of my mats 52 will produce exactly the desired density.

As was hereinbefore described, the "skin" 38 of partially polymerized binder material which covers the flat, longitudinal surfaces of my individual, un-heat-treated mats 52 is of such a consistency that when a plurality of my mats 52 are stacked one upon the other to form a stacked mat 58, and pressure is applied to this stacked mat 58, the individual laminations 52 firmly adhere to each other. However, this "skin" 38 is sufficiently tough to cause the individual mats 52 to retain their shapes and to not adhere to objects with which they happen to come into contact, so that my stacking process is not hindered by any difficulties in handling the individual mats 52.

After I have completed stacking my individual, un-heat-treated mats 52 in the above manner, I perform the heat-treating step in my process preferably using my stacked mat 58. Although I shall describe my heat-treating method in connection with my stacked mat 58, it is to be understood that my present invention also contemplates the heat-treating of a single one of my individual, un-heat-treated mats 52 in the same manner, as is hereinafter described.

Aside from the "skin" of partially polymerized binder material which covers the exposed, flat, longitudinal surfaces of the mats 52 which compose my stacked mat 58, my mat 58 is virtually uncured, that is, unpolymerized. Such virtually uncured single mats 52 and stacked mats 58 are entirely novel in the art of making fiber glass mats, as the binder material in all prior art processes for making mats is completely cured during the original formation of the mat.

I place my mat 58 between a pair of pressure plates 66 and 68, respectively, as shown in Figure 6, so that the working surfaces 70 and 72 of my respective pressure plates 66 and 68 operatively engage the flat, longitudinal surfaces of my mat 58. Then I apply pressure through pressure plates 66 and 68 and pressure plate supporting members 74 and 76, respectively, to mat 58 in order to compress mat 58 to the desired thickness and density and to form my stacked mat 58 into a laminated mat.

Then I subject my compressed mat 58 to heat, which may be applied by any conventional means, such as, for instance, by merely heating the pressure plates 66 and 68 through a pair of heating elements 78 and 80, respectively, disposed in pressure plates 66 and 68. These heating elements 78 and 80 may, in turn, be controlled by electricity, gas, steam or any other suitable means.

If my compressed mat 58 has a relatively low density, such as less than 12 pounds per 144 cubic inches, the mat 58 may alternatively be heated by forcing hot air therethrough. On the other hand, a relatively densely compressed mat 58 may alternatively be heated by a suitable dielectric process. Both of these alternative heating methods are well known in the art, and hence are not shown in the drawings hereof.

Figure 7 illustrates the structure of some typical individual secondary glass fibers 24 and the associated droplets of binder solution thereon before my heat-treating process has been applied.

During the prior art curing process of a mat having binder droplets deposited on fibers 24 in the manner shown in Figure 7, the mat was heated and the droplets of the binder then flowed along the glass fibers 24. As this prior art heating was continued, the moisture was removed from the binder, while at the same time the binder flowed along the fibers 24 to juncture points 82 where a plurality of adjacent fibers contacted each other. This prior art heat treatment was continued until all of the moisture was removed from the binder and substantially all of the binder material had thus concentrated at juncture points 82. This prior art process thus caused the binder material to be fully polymerized and brittle.

When a mat which was thus formed by the above prior art process was compacted, the concentrations of brittle binder material at the fiber juncture points 82 tend to crack. Also, the juncture points 82 were made so rigid by these concentrations of hard binder material that the fibers themselves broke near the juncture points 82 upon compaction of this prior art mat.

An additional problem in connection with these prior art mats was that the glass fibers at points other than juncture points 82 were substantially completely without any protective binder material thereon, so that when adjacent, non-contacting fibers were moved into contact with each other by the compacting of the mat, there was no protective binder cushion between these fibers, and the abrasion at the sharp point of contact between the contacting glass fibers caused one or both of the contacting fibers to break.

In carrying out my present invention I apply heat to my compressed mat 58 until the flow point of the binder solution is reached so that the particular droplets of binder solution 84 and 85 which are shown on the glass fibers 24 in Figure 7 begin to flow along the fibers 24. Then I continue my heating until all of the particular droplets 84 and 85 shown in Figure 7 which are not at fiber juncture points 82 become smears 86 and 88 of binder material on the glass fibers 24, as shown in Figure 8.

However, I reduce or arrest my heating before most, if not all, of the particular binder droplets 84 and 85 which were not originally sprayed on the juncture points 82, are able to flow to the fiber juncture points 82. By thus controlling the heating the droplets of resin 84 and 85, which are deposited close to the glass fiber juncture points 82, as shown in Figure 7, are caused to flow laterally along the glass fiber and become transformed into smears of binder material 88 which, though they are also close to the fiber juncture points 82 do not touch or reach them, as is shown in Figure 8. Thus most of my droplets 85 do not flow to the fiber juncture points 82 as did the droplets in the prior art.

Similarly, my droplets 84 and 85 of binder material which are sprayed onto the glass fibers 24 at points more remote from the fiber juncture points 82 are transformed by my heat treatment into smears 86 of binder material at positions along the glass fibers 24 corresponding to the points of location of binder droplets 84 which are not at the juncture points as seen in Figure 7.

Thus, most of the binder material in my heat-treated mat 58 will be deposited in smears along the glass fibers 24 at points other than juncture points 82.

A sufficient number of binder droplets 90 will be sprayed onto the glass fiber juncture points 82 as shown in Figure 7 to form a bond or smear 92 between adjacent glass fibers, as shown in Figure 8, when the droplets 90 are heat-treated in accordance with my present invention.

In addition to reducing or arresting my heat treatment before most of the binder is able to concentrate at the juncture points 82 between adjacent contacting fibers, I reduce or withdraw my heat before the binder material is fully polymerized. This leaves the binder material in a pliable condition instead of being hard and brittle, so that it will not crack when the mat 58 is flexed. Different percentages of total binder polymerization are best suited for varying ultimate uses of my completed mat 58, so that it is to be understood that my present invention is not restricted to any particular percentage of full polymerization. My present invention includes any degree of polymerization short of total polymerization.

I have found that when my binder material is polymerized to the correct degree for most uses of my mat, removal of the heat at this time leaves the binder material properly distributed in smears along the fibers 24 as hereinabove described and as illustrated in Figure 8.

By heating my mat 58 in the manner hereinabove described I partially polymerize my binder material by removing a portion of the water or other liquid in which the binder is dissolved. The degree of polymerization of the binder which results from my heat treatment is therefore determined by the amount of moisture that is removed from the binder, which in turn is fixed by the amount of heating of the mat 58.

Other factors which I consider in achieving the desired degree of polymerization and my proper binder distribution as shown in Figure 8, are the type of glass and the size of the glass fibers. My preferred glass fiber diameter range is from 0.00005 to 0.00025 inch.

Also the quantity ratio of glass fibers to binder must be adjusted correctly in order for the product to be properly polymerized. In the preferred embodiment of my invention the total weight of the binder material comprises less than 30% of the total weight of the completed mat.

One procedure which I follow in producing my mat in which the binder is polymerized to a desirable percentage of total polymerization and in which the binder is properly distributed throughout the fibers, as shown in Figure 8, is to heat my mat until the binder flow point is reached and then to continue the heating until a static condition prior to complete polymerization is reached.

The flow point of any particular binder is readily ascertainable by making tests on the particular binder. The flow point is varied in any binder by mixing additives with the binder. Thus, it is preferable to use a binder which either does not have any additives whatsoever, or which has an exact quantity of a known additive therein. In addition to varying the flow point, some additives, such as wetting agents, vary the actual rate of flowing after the flow point has been reached.

When the binder material has reached a static condition prior to complete polymerization the binder has been partially polymerized or partially cured to the extent that no weathering or further heating of the binder will change the structure of the binder, with the exception of further heating at some temperature above a predetermined temperature. Thus, no further aging or evaporation of the binder solvent will take place, and no further polymerization will occur during operational use of the completed product. The predetermined temperature below which no further change in the binder will result is determined by the potential uses of the heat-treated mat 93, this temperature of necessity being greater than any temperature to which the mat might be subjected in use.

Once the flow point of the binder material has been reached during my heating process, the temperature may be retained at the flow point temperature for the necessary time to complete my heating cycle as hereinabove described, or the temperature may be raised to a higher value and the total heating time accordingly reduced. I have found that suitable results are obtained regardless of how much higher the heating cycle temperature is than the flow point temperature, so long as the time during which my mat is heated is correctly correlated to the temperature used.

For example, where my heat-treated mat 93 is to have a density of six pounds per square foot and a thickness of one inch, where my binder material is phenol formaldehyde and where my desired amount of polymerization is 78% of total polymerization, my un-heat-treated mat 58 may be heated at a temperature of 350 degrees F. for approximately eight minutes. Substantially the same percentage of total polymerization, and a substantially equally desirable distribution of binder on the fibers, is produced in my same mat with my same binder where I apply a temperature of 400 degrees F. for approximately three and one-half minutes.

The following is one method by which I work out a correct formula in accordance with the heat-treating step in my method of making a mat of glass fibers for any given binder material and type of glass. First, I determine the flow point temperature of my particular binder material. Next, I calculate the exact amount of heating time necessary to achieve full polymerization at the above flow point temperature. Then I determine the percentage of full polymerization which the end uses of my completed mat make the most advisable. Lastly, I determine the length of time during which the flow point temperature is applied to my mat by multiplying the percentage of total polymerization desired by the amount of time which was determined as necessary to achieve full polymerization at the flow point temperature.

One method of testing my heat-treated mat 93 to determine whether or not the desired percentage of total polymerization has been achieved therein is by use of an acetone extraction treatment. This treatment extracts the unpolymerized binder material from my heat-treated mat 93 so that this may be measured, and the percentage of full polymerization may thereby be determined.

Microscopic analysis may be used to determine whether or not my heating cycle has been arrested at the proper time to produce a fiber and binder structure in my heat-treated mat 93 substantially like that shown in Figure 8.

By reducing or arresting my heat treatment of mat 58 before the majority of the binder material concentrates at the juncture points 82 between adjacent fibers 24, most of my binder bonds 92 between adjacent fibers 24 are made less rigid than similar bonds in prior art mats because of their smaller size. Thus, my fibers 24 which are bound together by binder bonds 92 at juncture points 82 may be flexed relative to each other to a greater degree without fiber breakage than similar bonded fibers in prior art mats.

A further result of my process of reducing or removing the heat from mat 58 before the majority of the binder material concentrates at the juncture points 82 is that most of my binder material remains in my heat-treated mat 93 in the form of smears 86 and 88 on the individual glass fibers 24. By the law of averages, there will be at least one such smear of binder material between most of the adjacent non-contacting fibers in my finished mat. Thus, when my finished mat is compressed during use, and these adjacent non-contacting fibers are brought toward each other, in most instances there will be a smear of binder material which acts as a pliable or resilient cushion between these fibers. This binder cushion prevents abrasion between these fibers as they are brought toward each other, so that neither of the fibers will break.

By reducing or arresting my heating before complete polymerization of my binder material, most of the binder in my heat-treated mat 93 is made pliable or resilient. This characteristic of my heat-treated mat 93 eliminates most of the cracking of binder bonds 92 at juncture points 82 between adjacent, contacting fibers 24. The pliability of my binder bonds 92 also permits greater resiliance between fibers 24 which are bound together by binder bonds 92 than is found in prior art mats, and for this reason prevents fibers 24 from breaking near the bonds 92 due to rigidity of bonds 92.

Another advantage of the pliability of the binder material in my heat-treated mat 93 is that the binder material which is disposed along the individual fibers 24 in the form of smears 86 and 88 will not crack when the fibers 24 are bent upon compression of the heat-treated mat 93.

A further advantage of my pliable binder material is that the cushioning effect of the binder smears 86 and 88 when adjacent non-contacting fibers 24 are brought toward each other upon compression of my heat-treated mat 93 is greatly enhanced. This cushioning effect not only prevents glass fiber breakage by spreading the point of contact between these fibers which are brought toward each other over a relatively large area but it directly increases the resilience of my heat-treated mat 93 by permitting the binder smears 86 and 88 to flex when adjacent non-contacting fibers 24 are thus brought toward each other.

All of these above structural characteristics of my heat-treated mat 93, including the uniformity of my mat 58 which results from the stacking step of my mat-making process, and including the uniformity and freedom from impurities of my un-heat-treated individual mat laminations 52 which result from the above-described rigid controls that are applied during the formation of individual mat laminations 52, cooperate to produce a mat 93 which has unusually good load-deflection and fatigue characteristics.

The heat-treating step in my process enhances the load-deflection and fatigue characteristics of my mat 58 primarily for the reason that only a very small number of my glass fibers 24 and my binder bonds 92 will break during operational use of my heat-treated mat 93.

An important advantage of my present invention lies in the fact that my mat 58 which is to be heat-treated in accordance with my invention is bound together by a binder material which is virtually unpolymerized when the mat 58 is compressed between the pressure plates 66 and 68 and my heating operation is commenced.

By using such a virtually unpolymerized mat 58 I am able to compress the mat 58 down to any desired density between my pressure plates 66 and 68 without disturbing the uniformity of the glass fiber and binder distribution in the mat. By then applying my hereinabove described heat treatment to the already compacted mat 58 while the mat is in the compacted state between pressure plates 66 and 68 the thickness of my heat-treated mat 93 is permanently fixed as the distance between pressure plates 66 and 68, and, hence, the desired density, whatever it may be, is also permanently fixed.

My method of compacting the virtually uncured mat 58 and then heat-treating the mat 58 permits both the thickness and the density of my heat-treated mat 93 to be accurately controlled. On the other hand, the prior art method of curing a mat of glass fibers while the mat is originally being formed does not permit such accurate density and thickness control.

After I have completed the heat-treating step of my method of making a fiber glass mat, I then perform my cold working, or cycling step, which is the last step in my process. Although I shall describe my cold working, or cycling method in connection with my heat-treated laminated mat 93, it is to be understood that my present invention also contemplates the cold working, or cycling, in the same manner, of a single one of my individual mats 52 which has been heat-treated in accordance with my above heat-treating method.

I place my mat 93 between the lower and upper pressure plates 94 and 96, respectively, of my cycling apparatus so that the working surfaces 98 and 100 of the respective pressure plates 94 and 96 operatively engage the exposed lower and upper flat, longitudinal surfaces of the mat 93, respectively, as shown in Figure 9.

My cycling apparatus pressure plates 94 and 96 may be made of metal or of any other suitable material. Lower pressure plate 94 may be affixed to a bench, table or other stationary object 101 so that it will not move when pressure is applied thereto through the mat 93. The upper pressure plate 96 is mounted on a supporting member 102 which in turn is operatively connected to a reciprocating machine (not shown) that is adapted to forcefully move supporting member 102 reciprocally up and down.

Although my reciprocating machine (not shown) may be of any conventional design, in the preferred embodiment of my invention the stroke length and the frequency of the reciprocation of the reciprocating machine (not shown) are both adjustable. Thus, in turn, the stroke length of upper pressure plate 96 and its frequency of oscillation are both adjustable.

After I have disposed my mat 93 between pressure plates 96 and 98 in the manner shown in Figure 9, I set the reciprocating machine (not shown) into operation to cause an up and down reciprocating or cycling motion of the upper pressure plate 96. My mat 93 is thus compacted to a stress loaded condition when upper pressure plate 96 is in its lowermost position as shown in Figure 10, and mat 93 is unloaded when upper pressure plate 96 is in its uppermost position as shown in Figure 9.

The maximum load which I apply to mat 93 through pressure plates 94 and 96 during each cycle of my cycling process is termed the "processing load" of my mat 93. This "processing load" gradually decreases as my cycling process progresses for any given percentage of total compression of my mat 93 to which I subject mat 93.

In the preferred embodiment of my invention I adjust the stroke length of the reciprocal motion of my upper pressure plate 96 so that the mat 93 will be compressed to a greater extent than it will be compressed during the maximum anticipated operational use of my completed mat 93. This anticipated maximum operational compression of my mat 93 is termed the "design point" of the finished mat 93.

The load necessary to compress my finished mat 93 to the design point is termed the "design load" of my mat 93. In the preferred embodiment of my invention, when I cycle mat 93 to a greater compression than the "design point" of mat 93, my "processing load" will be greater than my "design load." However, my cycling process can be applied to the same, or to a lesser compression than the "design point" of my mat 93, so that my "processing load" can be the same as, or less than my "design load."

A typical stroke length of my cycling operation is one-half of the thickness of the mat 93. Figure 10 illustrates the condition of the mat 93 shown in Figure 9 and the relative positioning of the pressure plates 94 and 96, when plate 96 is at the lowest point in its cycle of motion and when the stroke length is adjusted to one-half of the thickness of the mat 93.

The duration of my cycling operation is determined in each case by the cycling frequency and by the character of the anticipated operational use of my mat 93.

Thus, for a relatively low cycling frequency the duration of the cycling is relatively long.

If my finished, cycled mat 93 is to be subjected to relatively infrequent compaction during operational use, my cycling may be of relatively short duration. This is for the reason that there is less chance for mat fatigue during operational use of the mat 93 if my completed, cycled mat 93 is only to be subjected to a relatively small number of compactions during its use.

Having generally described my cold-working, or cycling operation, I will now more particularly describe the effects of my cold-working, or cycling on the actual fiber and binder structure of my mat 93. These effects are illustrated in Figures 11 to 14 inclusive.

Prior art mats of glass fibers were bound together by a binder material which was concentrated at the juncture points between adjacent, contacting glass fibers. This left the greater portion of most of the individual glass fibers without a covering, or cushion of binder material in prior art mats. Thus, most of the adjacent, non-contacting fibers in these prior art mats comprised bare glass fibers. When such prior art mats were compacted during operational use, these adjacent, non-contacting glass fibers were brought into abrasive inter-contact. Figure 11 illustrates a pair of these bare, adjacent, non-contacting glass fibers 104 and 106 which have been brought into abrasive contact in the above manner. This abrasive contact between these two bare glass fibers, 104 and 106, which occurred at a single point of contact, caused one, or both of the contacting fibers to break. Thus, in Figure 11, glass fiber 106 was broken at 108 by the abrasive contact between fibers 104 and 106 when the mat was compacted. The breakage of many of the glass fibers in prior art mats during use of these mats caused operational fatigue of these prior art mats. It also caused load-deflection characteristics to rapidly vary and to become progressively poorer as the mat was used more and more.

A substantial portion of the adjacent, non-contacting glass fibers in my mat 93, which has been heat treated in accordance with my present invention have at least one cushion of a pliable binder material disposed between them. The cushion of binder material is in the form of a smear of binder material on at least one of these adjacent, non-contacting glass fibers.

When these adjacent, non-contacting glass fibers, having a cushion of binder material between them, are moved sufficiently toward each other by compaction of my mat 93, either during operational use of my mat, or during my cold-working, or cycling process, the binder smear forms a pliable binder pad, or cushion between the glass fibers. Such a pair of adjacent, non-contacting glass fibers 110 and 112 which have a binder smear 114 between them and which have been moved toward each other is shown in Figure 12. This pad, or cushion 114 of binder material between glass fibers 110 and 112 provides a relatively large area of contact between fibers 110 and 112, as seen in Figure 12, instead of the single point of contact, seen in Figure 11, between any of the adjacent, bare fibers which may be brought into contact. Thus, fibers 110 and 112 bend at points 116 and 118 in the manner shown in Figure 12, instead of breaking in the manner shown at 108 in Figure 11.

However, a certain portion of my adjacent, non-contacting fibers do not have a cushion of my pliable binder material between them. During my cold-working, or cycling of mat 93, many of these bare glass fibers are brought together into abrasive contact in the same manner as fibers 104 and 106 in Figure 11, which causes one, or both of the glass fibers 104 and 106 to break in the manner illustrated by break 108 of glass fiber 106 in Figure 11. As my cycling process progresses, more and more of these bare fibers 104 and 106 are broken. I continue my cycling until a substantial portion of these bare, adjacent fibers 104 and 106 throughout the mat 93 are broken.

The load-deflection and fatigue characteristics of my finished mat are progressively increased as a greater number of these adjacent, non-contacting, bare fibers 104 and 106 are broken throughout my mat 93. For this reason, in the preferred embodiment of my invention, I break one or both of these adjacent, non-contacting, bare glass fibers 104 or 106 in the majority of such pairs of glass fibers 104 and 106 throughout my mat 93.

When my finished, cycled mat 93 is then compacted during operational use to a lesser degree than it was compacted during my cold-working, or cycling operation, most of the adjacent, non-contacting fibers which move toward each other, due to such compaction, have a layer of my pliable binder material between them which causes them to bend, as in the manner shown in Figure 12, instead of breaking, as, for example, in the manner shown in Figure 11. This process almost completely eliminates fiber mat fatigue in my finished, cycled mat 93, and it stabilizes and greatly enhances the load-deflection characteristics of my finished, cycled mat 93.

In prior art glass fiber mats, many of the adjacent glass fibers, such as glass fibers 120 and 122 in Figure 13, were bound together by a brittle bond 124 of substantially completely polymerized binder material. Upon relative movement between such adjacent glass fibers 120 and 122 due to compaction of these prior art mats, the brittle bond 124 of polymerized binder material would break, as at numeral 126 in Figure 13, causing complete disengagement of the fibers 120 and 122. After such disengagement, fibers 120 or 122, or both, will break, in the manner of fiber 106 described above, upon further compaction or operational use of the prior art mat.

In my mat 93 which has been heat-treated in accordance with my present invention, my bond 124 between adjacent, contacting glass fibers such as 120 and 122 is pliable, so that relative motion between my fibers 120 and 122 will not cause my bond 124 to break as at 126 in Fig. 13.

However, even in my mat 93, which has been heat-treated in the above manner, by the law of averages, some of my adjacent fibers 120 and 122 may be bound together by a bond 124 which is brittle. A substantial portion, and preferably the majority of such brittle bonds 124 and fibers 120 and 122, in my preferred mat 93 are broken during my cold-working, or cycling process. This leaves most of my remaining adjacent glass fibers 120 and 122 that are bound together by a pliable binder material unbroken after my cold-working, or cycling process has been completed. Any relative movement between glass fibers 120 and 122 during operative use of my finished mat 93 after my cold-working, or cycling process has been completed will merely twist and untwist pliable bonds 124, but will not break them. Thus, the load-deflection and fatigue characteristics of my finished, cycled mat 93 are thereby greatly enhanced.

Although my mat 93 is composed essentially of binder and glass fibers which are of substantially uniform diameter, occasionally an unbroken, oversized glass fiber will be disposed in my mat 93.

During my cold-working, or cycling process, such an oversized fiber will probably be in contact with an adjacent, normal-sized fiber. An oversized fiber 128 which is so disposed in contact with a normal-sized fiber 130 is shown in Figure 14. When these two fibers 128 and 130 are thus brought into contact, the rigidity of oversized fiber 128 will prevent it from bending any appreciable amount, so that substantially all of the bending between the two fibers 128 and 130 will occur in the normal-sized fiber 130. This causes an unusually great amount of bending in the normal-sized fiber 130 as shown in Figure 14. The large stresses then set up in oversized fiber 128 due to the force of the bent normal-sized fiber 130 will cause oversized fiber 128 to break, as at 132 in Figure 14. Breakage of oversized fiber 128 will occur more readily if the pressure of more than one bent normal-sized fiber 130 is applied thereto.

Even though a smear of pliable binder material such as that shown at 134 in Figure 14 may be disposed between the fibers 128 and 130 to provide a pliable binder cushion at the point of contact between fibers 128 and 130, the stresses set up in oversized fiber 128 by the bent normal-sized fiber 130 may be sufficient to break oversized fiber 128.

By thus breaking such oversized fibers 128, I effectively remove many of the oversized fibers 128 from operative engagement with normal-sized fibers 130 during normal use of my completed, cycled mat 93 so that the bad effects which such oversized fibers 128 have on the load-deflection and fatigue characteristics of my mat are removed.

Figure 15 is a graphical illustration of a typical instance of my cold-working, or cycling process when used in connection with one of my mats 93.

The horizontal axis of Figure 15 indicates the number of cycles from 0 to 1,000,000 cycles to which my mat 93 has been subjected under a "processing load" corresponding to fifty percent (50%) compression, such as that illustratively shown in Figure 11. The vertical axis of Figure 15 indicates the load required from 0 to 6 pounds per square inch to compress my mat 93 to a "design load" which corresponds to forty percent (40%) compression during the fifty percent (50%) compression cycles. Thus, the curve shown in Figure 15 is a fatigue curve of my cycling process.

The fatigue curve shown in Figure 15 begins to level off at 136 and then slowly drops off up to numeral 138 at the 1,000,000 cycle point. This means that by the time the curve in Figure 15 reaches point 136, a substantial portion of the adjacent fibers such as 104 and 106 in Figure 11, have been broken, as at 108, that a substantial portion of the brittle binder bonds 124, such as that shown in Figure 13, have been broken, as at 126, and that a substantial portion of the oversized fibers, such as fiber 128 in Figure 14 have been broken, as at 132.

The curve in Figure 15 is extended far beyond my usual number of cycles to a point 138 where the horizontal axis reaches 1,000,000 cycles. The fact that the curve drops only gradually from the point 136 at which it begins to level off to the point 136 where it reaches 1,000,000 cycles indicates that the number of cycles at the point where the curve begins to level off is substantially all the cycling that is necessary in order to produce one of my finished, cycled mats 93 which will easily withstand almost infinite further compressions up to the hypothetical design load of forty percent (40%) without any substantial fatigue in the finished, cycled mat 93.

The additional cycling between the point 136 where the curve in Figure 15 begins to level off and the 1,000,000 cycle point 138 on the curve may be considered as compressions of the mat 93 to fifty percent (50%) compression during operative use of the mat 93, so that the curve of Figure 15 is a clear illustration of the quality of my completed, cycled mat 93 for uses which subject it to frequent compressions.

Thus, by my present invention I have produced a mat 93 of glass fibers which is virtually free from all impurities and which is substantially uniform throughout in density and thickness. I have also produced a fiber glass mat which has any desired thickness and weight.

Further, by my present invention, I have produced a mat 93 which is composed of glass fibers that are bound together by a partially polymerized binder material, and which has been cold-worked, or cycled. Both of these features give my completed mat 93 unusually good load-deflection and fatigue characteristics.

It is to be understood that the form of my invention herein shown and described is my preferred embodiment and that various changes in the shape, size, arrangement of parts and operative steps may be resorted to without departing from the spirit of my invention or the scope of the appended claim.

I claim:

The method of making a resilient laminated mat of glass fibers which comprises the steps of forming a plurality of individual mats of glass fibers coated with uncured thermo-setting resinous binder at intervals, each of said mats consisting of glass fibers substantially all of which are lying in the same plane and extending in the same direction, said thermo-setting resinous binder being only partially cured by the application of heat for a predetermined time short of heat-curing said resinous binder, stacking said individual mats one upon the other to provide a laminated glass fiber body of the desired thickness, heating said compressed laminated mat to cause said thermo-setting resinous binder to flow and increase the area of the fibers covered by the resin on the individual glass fibers at intervals throughout the length of the fibers and at the intersection of some of the fibers where they engage one another to hold them in engaging position, thereafter terminating the heating to provide an uncured thermo-setting resinous binder throughout the laminated mat, and thereafter cold-working said laminated mat by repeatedly subjecting the same to loading and unloading stress conditions to produce a finished glass fiber mat having high load-deflection and fatigue characteristics and which withstand relatively high load stresses without crumbling.

RALPH E. SCHWARTZ.

References Cited in the file of this patent

UNITED STATES PATENTS

| Number | Name | Date |
|---|---|---|
| 2,335,102 | Bergin et al. | Nov. 23, 1943 |
| 2,349,909 | Meharg | May 20, 1944 |
| 2,375,182 | Anway | May 8, 1945 |
| 2,489,242 | Slayter et al. | Nov. 22, 1949 |
| 2,600,843 | Bush | June 17, 1952 |